United States Patent [19]

Jennings

[11] Patent Number: 4,713,863

[45] Date of Patent: Dec. 22, 1987

[54] REUSEABLE CLAMP WITH AN OUTWARDLY PROJECTING EAR ON EACH OPPOSING END AND HAVING A HOOK SHAPED PROJECTION ON ONE EAR ADAPTED FOR INTERLOCKING COACTION WITH AN OPENING IN THE OTHER EAR

[75] Inventor: Ralph N. Jennings, Grafton, Ohio

[73] Assignee: Triad Metal Products Company, Cleveland, Ohio

[21] Appl. No.: 5,217

[22] Filed: Jan. 20, 1987

[51] Int. Cl.$^4$ ............................................. B65D 63/02
[52] U.S. Cl. ................................ 24/20 R; 24/20 EE; 24/20 CW; 24/23 EE
[58] Field of Search ............ 24/20 R, 20 CW, 20 EE, 24/23 EE, 273

[56] References Cited

U.S. PATENT DOCUMENTS

| | | | |
|---|---|---|---|
| 427,355 | 5/1890 | McLaren, Jr. | 24/20 EE |
| 673,382 | 5/1901 | Chaffee . | |
| 870,763 | 11/1907 | Chaffee . | |
| 1,379,476 | 5/1921 | Parr | 24/20 CW |
| 1,547,208 | 7/1925 | Farmer | 24/23 EE |
| 3,066,903 | 12/1962 | Tinnerman | 24/23 EE |
| 3,139,261 | 6/1964 | Tinnerman | 24/20 EE |
| 3,321,811 | 5/1967 | Thomas . | |
| 3,358,351 | 12/1967 | Ott | 24/23 EE |
| 4,275,484 | 6/1981 | Irio et al. | 24/23 EE |
| 4,280,258 | 7/1981 | Kunge | 24/16 PB |
| 4,442,155 | 4/1984 | Foertsch et al. | 24/20 EE |
| 4,451,955 | 6/1984 | Kern et al. | 24/20 EE |
| 4,517,708 | 5/1985 | Calmettes et al. | 24/20 CW |

FOREIGN PATENT DOCUMENTS 1013380  12/1965  United Kingdom ............ 24/20 EE

*Primary Examiner*—Victor N. Sakran
*Attorney, Agent, or Firm*—Baldwin, Egan, Hudak & Fetzer

[57] ABSTRACT

A reuseable open type clamp comprising an arcuate-like strap having two generally opposing, spaced ends, each of which has been bent outwardly of the general periphery of the clamp, to form first and second ears with one of the ears having an aperture therein and the other of the ears having a projection thereon extending outwardly from its respective ear, with the projection being adapted to be received in the aperture in the closed condition of the clamp, to hold the strap in closed clamping condition. Removal of the projection from the aperture enables the clamp to spring to open position due to the nature resiliency of the strap portion.

15 Claims, 6 Drawing Figures

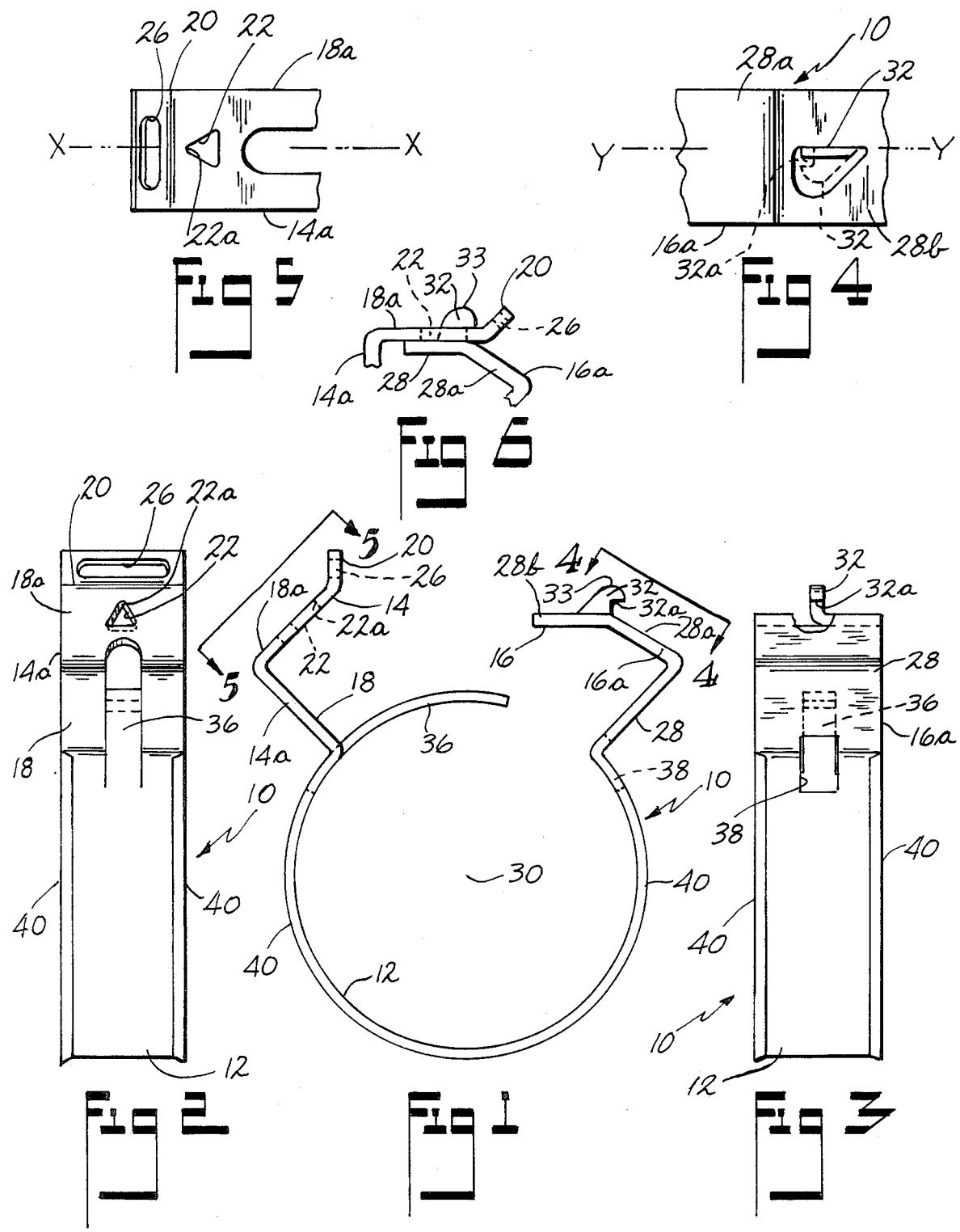

REUSEABLE CLAMP WITH AN OUTWARDLY PROJECTING EAR ON EACH OPPOSING END AND HAVING A HOOK SHAPED PROJECTION ON ONE EAR ADAPTED FOR INTERLOCKING COACTION WITH AN OPENING IN THE OTHER EAR

This invention relates in general to clamps, such as for instance conventionally used in clamping flexible tubing to a coacting rigid tube or pipe, and more particularly an open type of reuseable clamp that embodies a projection on one end of the arcuate strap portion thereof and having an aperture on the other end thereof, with the projection being adapted to be received in said aperture in coacting engaged relation with the periphery thereof, for releasably holding the clamp in closed clamping condition, and with the projection being expeditiously disengageable from the aperture, thus permitting opening of the clamp.

BACKGROUND OF THE INVENTION

Reuseable open type clamps of this general type are known in the prior art, and are disclosed for instance in U.S. Pat. No. 4,275,485 dated June 30, 1981 to Francis Irio et al, and entitled "Open-Type Clamp", and U.S. Pat. No. 4,517,708 dated May 21, 1985 in the name of Lionel Calmettes et al and entitled "Clamp". Such prior art clamps are generally more complex, and more costly to produce, as compared to applicant's, and are not as readily openable.

SUMMARY OF THE INVENTION

The present invention provides a novel reuseable open type clamp, which utilizes a projection on one end of the arcuately formed strap member thereof, and an aperture in the other end thereof adapted to receive the projection therein, and to hold the clamp in closed clamping condition, and which is readily deactivated by causing movement of the projection of the clamp out of engaged relation with the periphery of the aperture.

Accordingly, an object of the invention is to provide a novel reuseable, open-type clamp which is mass producible.

Another object of the invention is to provide a clamp of the aforementioned type in which the opposing ends of the strap portion thereon are bent outwardly of the general periphery of the clamp to form first and second ears, with one of the ears including the aperture therein, and the other ear including the projection thereon, adapted for coacting relation with the periphery of the aperture, for releasably holding the strap of the clamp in closed clamping condition, and with the aperture being of generally triangular shape in plan, and the projection including an edge adapted for coaction with the apex of the aperture to facilitate entry of the projection into the aperture, and withdrawal of the projection from the aperture.

A further object of the invention is to provide a clamp of the aforementioned type in which the projection is of a hook shaped configuration and is formed of the material of the associated ear portion and is bent out of the plane thereof, so as to extend outwardly of the associated ear portion.

A still further object of the invention is to provide a clamp of the above described type which includes an extension directed generally along the periphery of the arcuate body portion of the clamp and toward the second ear thereof, and which is formed of the material of the strap.

Other objects and advantages of the invention will be apparent from the following description taken in conjunction with the accompanying drawings wherein:

BRIEF DESCRIPTION OF THE DRAWINGS

FIG. 1 is a side elevational view of a clamp embodying the invention, with the clamp being in non-clamped condition;

FIG. 2 is an end elevational view of the clamp of FIG. 1 taken from the left hand end thereof;

FIG. 3 is an end elevational view of the clamp taken from the right hand end thereof as viewed in FIG. 1;

FIG. 4 is a fragmentary view taken generally along the plane of line 4—4 of FIG. 1, looking in the direction of other arrows;

FIG. 5 is a fragmentary view taken generally along the plane of line 5—5 of FIG. 1, looking in the direction of the arrows; and FIG. 6 is a fragmentary view of the projection coacting with the aperture to hold the clamp in closed clamping condition.

DESCRIPTION OF PREFERRED EMBODIMENT

Referring now again to the drawings, there is illustrated a clamp 10 which is formed from yieldable and preferably resilient material, such as for instance spring steel, or tempered sheet metal, or stainless steel, and which comprises a strap body 12 formed into a generally arcuate configuration and having two generally opposing ends 14 and 16, which have been bent outwardly of the general periphery of the clamp body, to form first and second ears 14a and 16a.

Ear 14a is of generally inverted L-shape configuration in side elevation (FIG. 1) and includes a first portion 18 extending generally radially outwardly from the clamp body 12 and a second portion 18a which extends generally perpendicularly from the first portion 18, with portion 18a at its distal end being bent outwardly as at 20 (FIGS. 1 and 5).

Portion 18a has an opening or aperture 22 formed therein, with the aperture 22 being preferably of generally triangular configuration, as illustrated, with the apex 22a thereof being disposed along the general lengthwise center line X—X of the ear and in a direction toward the outwardly bent distal end 20 thereof. Section 20 may also include an elongated opening 26 therein, as best shown in FIGS. 2 and 5, for a purpose to be hereinafter set forth.

The other ear 16a of the clamp includes a first portion 28 which extends angularly outwardly from the plane of the strap body 12, and a second portion 28a disposed angularly to portion 28, and extending toward the first ear 14a, and then a third portion 28b which extends angularly with respect to portion 28a and which is generally horizontal as viewed in FIG. 1, and disposed in a plane which is generally perpendicular to a vertical plane passing through the axis of curvature 30 of the clamp body 12, and extending between the confronting ends 14 and 16 of the clamp.

Portion 28b includes a projection 32 thereon extending outwardly from ear 16a, with projection 32 being of hook shaped configuration, and including lip 32a. Projection 32 is adapted to be received through aperture 22 in the first ear 14a, with the lip 32a overlapping the apex 22a of the aperture in holding coaction, for holding the clamp in closed clamping condition, and as shown for instance in FIG. 6. The resistance to deformation of the clamp maintains the aperture and received projection in interlocked coaction.

Closing of the clamp may be accomplished by utilizing a tool, such as a pair of pliers, and squeezing the ears 14a, 16a between the jaws of the pliers, to cause movement of the ears toward one another until the projection 32 snaps into aperture 22, with lip 32a of the projection overlapping portion 18a of ear 14a, and as shown in FIG. 6.

Removal of the projection 32 from aperture 22 to permit opening of the clamp, can be accomplished by moving projection 32 rearwardly relative to aperture 22, or by moving aperture 22 forwardly relative to projection 32, or by simultaneously accomplishing both of the foregoing. In this connection opening of the clamp may be expeditiously accomplished by inserting the blade of a tool, such as a screw driver, through the aforementioned slot 26, and upon rocking the screw driver forwardly utilizing ear 16a as the fulcrum base, ear 14a (and associated aperture 22) is moved forwardly relative to projection 32. When the lip 32a of the projection clears the forward or apex end of aperture 22, portion 18a of ear 14a will automatically spring upwardly relative to the projection 32, while the resilient "memory" of the clamp will cause the ends 14 and 16 to spring apart relative to one another, and back to the general positions illustrated in FIG. 1.

The defining edge 33 of the head of projection 32 is preferably arcuate, as shown, commencing at the outer end of lip 32a, with arcuate edge 33 preferably extending upwardly and then downwardly, as shown in FIGS. 1 and 6. Arcuate edge 33 facilitates entry of the projection into the receiving opening or aperture 22 upon closing of the clamp, by relative sliding coaction between edge 33 and the periphery of aperture 22, during movement of the ears 14a and 16a toward one another to accomplish closing of the clamp. Edge 33 also facilitates withdrawal of the projection from aperture 22 when the aperture is moved forwardly relative to the projection in the above described opening of the clamp, with the arcuate edge 33 sliding relative to the defining edge of the aperture 22, to permit ears 14a, 16a to spring open relative to one another.

Moreover, in the closed condition of the clamp with projection 32 projecting into aperture 22, and disposed toward the apex end 22a of triangular aperture 22, the overlapping leg portions are automatically forced into alignment with one another (in other words the lengthwise axes X—X and Y—Y thereof will be generally aligned).

The clamp preferably includes an extension 36 at the juncture of the first ear with the strap body 12, and which is preferably formed from the material of the ear 14a, and bent out of the plane thereof, so as to project generally toward the ear 16a. The strap body 12 at the juncture of ear 16a with the strap body is apertured as at 38 and is adapted to receive therethrough the extension portion 36 in the closed clamped condition of the clamp.

The peripheral edges 40 of the arcuate strap body are preferably bent diagonally outwardly to form strengthening reinforcement for the body, thus aiding in strengthening the clamp against deformation and causing increased resiliency for the clamp, contributing to automatic opening of the latter when the locking projection 32 is released from the aperture 22.

While the preferred material for formation of the clamp is spring metal, it will be seen that the clamp might be molded of plastic material with sufficient rigidity and resiliency so as to cause it to operate in the manner aforedescribed in connection with a metallic clamp, with the clamp portions being molded instead of being bent. A plastic clamp with presently known plastic materials, would probably possess relatively limited strength however.

From the foregoing discussion and accompanying drawings, it will be seen that the invention provides a reuseable open type clamp comprising an arcuate strap body having generally two opposing ends which extend outwardly of the general periphery of the clamp body to form first and second ears, with the ears being of generally inverted L-shape configuration in side elevation, and with one of the ears including aperture means therein adapted to receive a generally radial projection on the second ear, in coacting engaged relation with the periphery of the aperture, so as to releasably hold the clamp in closed clamping condition, with the projection being withdrawable from the aperture to permit automatic opening of the clamp.

The invention also provides a novel reuseable clamp of the aforementioned type wherein the clamp can be mass produced or fabricated from resilient material, preferably spring steel, thus resulting in an economically desirable, reuseable clamp member.

The terms and expressions which have been used are used of terms of description and not of limitation, and there is no intention in the use of such terms and expressions of excluding any equivalents of any of the features shown or described, or portions thereof, and it is recognized that various modifications are possible within the scope of the invention claimed.

I claim:

1. A reuseable clamp comprising a strap of resilient material having a curved body portion and generally opposed end portions, one of said end portions having a projection extending outwardly therefrom and the other end portion including an opening formed therein through which is adapted to be received said projection, in the tightened condition of the clamp, said projection being adapted to engage the defining periphery of said opening and hold said end portions in connected condition, said projection including means facilitating the entry of said projection into said opening for holding the clamp in closed clamping condition, and for withdrawal of said projection from said opening to permit opening of said clamp, and wherein said one end portion of said strap comprises a section disposed substantially normal to the plane of the strap of said body portion and then a section which is bent generally diagonally upwardly and then a section bent to extend generally horizontally from said diagonal section, to form said one end portion of said strap, with said projection being disposed on said horizontal section, said other end portion of said strap comprising a first section which extends generally normal to the plane of said strap and then a section which is turned to extend generally at an angle of approximately 90° with respect to said first section, and then a further section which is tipped upwardly relative to said 90° section, said opening being disposed in said 90° section and being of triangular configuration in plan, with said projection being of hook-shaped configuration, said further section having a transversely extending opening therein.

2. A clamp in accordance with claim 1 formed of spring steel.

3. A clamp in accordance with claim 1 wherein said projection is of generally hook shaped configuration, with the hook portion facing in a direction away from the respective end of the strap.

4. A clamp in accordance with claim 1 wherein said projection comprises a hook shaped portion stamped from the material of said one end of the strap and then bent out of the plane thereof, so as to extend generally perpendicularly to the plane of said one end portion of said strap.

5. A clamp in accordance with claim 1 including an extension of said body portion projecting in a direction toward said one end portion of said strap and formed from the material of said strap.

6. A clamp in accordance with claim 1 wherein said projection is of generally hook shape configuration and extends generally normal to said one end portion of said strap, and is oriented along the lengthwise center line of said strap.

7. A clamp in accordance with claim 5 wherein said one end of said strap includes an opening formed therein of the general width of said extension, with said extension being adapted to be received through said opening in the tightened condition of said clamp.

8. A clamp in accordance with claim 1 wherein the peripheral edges of said strap body are provided with outwardly turned corners along the major portion of the curvature thereof.

9. A clamp in accordance with claim 1 wherein said projection has a hook shape and is provided from the material of said one end portion of said strap, and then is bent generally 90° out of the plane of said one end portion of said strap, to be oriented generally perpendicular to the plane of said one end portion of said strap, said projection being disposed generally along the center line of said strap, said projection having an arcuate top edge.

10. A clamp in accordance with claim 1 wherein said clamp is formed of spring stainless steel.

11. A reuseable open type clamp comprising an arcuate strap having two generally opposing ends each of which has been bent outwardly of the general periphery of said clamp to form first and second ears, said first ear being of generally inverted L-shaped configuration in side elevation and including aperture means therein adapted to receive a generally radial projection on said second ear in coacting engaged relation with the periphery of said aperture means, to releasably hold said strap in closed clamping condition, with said projection being removable from said aperture means to thus cause disengagement of said projection from said aperture means to permit opening of said clamp, and wherein said first ear includes a first portion extending generally radially from the arcuate portion of said strap at the juncture of said first ear to said arcuate portion of said strap and a second portion extending generally perpendicularly from said first portion and which at its distal end is bent outwardly, said distal bent end having a transverse opening therethrough for use in releasing said clamp from closed clamping condition, said aperture being disposed in said second portion generally adjacent the said distal bent end thereof, but prior to said distal end, said aperture, in plan, being of generally triangularly shaped configuration, and disposed along the lengthwise center line of said second portion, with the apex of said triangular shape facing in the direction of said bent end.

12. A clamp in accordance with claim 11 wherein said strap at the connection of said first ear comprises an extension directed generally along the periphery of said clamp toward said second ear, whereby said extension extends at least over the distance separating said ears in the closed clamping condition of said clamp.

13. A clamp in accordance with claim 11 wherein said projection comprises a hook shaped configuration extending outwardly from said second ear, with the hook portion of said projection facing in a direction away from said first ear, the top edge of said hook shaped configuration being arcuate, commencing at the lip of said projection.

14. A clamp in accordance with claim 11 wherein said second ear comprises a first portion projecting generally radially outwardly from the arcuate portion of said strap in spaced relationship to a perpendicular plane passing through the axial center of curvature of said clamp and disposed intermediate said ears, said second ear also comprising a second portion initially extending generally diagonally from said first portion and then being bent inwardly in the general direction of said arcuate portion of said strap, so as to be disposed in a plane which is generally perpendicular to the first mentioned plane passing through said axial center of curvature of said clamp, said projection being disposed on said second portion of said second ear and projecting outwardly therefrom, and being of generally hook shaped configuration in side elevation.

15. A clamp in accordance with claim 14 wherein said projection includes a lip adapted for engaged holding coaction with the apex of said triangular shaped opening for holding the clamp in closed clamping condition, the defining edge of said projection commencing at the outer end of said lip curving arcuately upwardly and then downwardly and aiding in the release of said ends to permit said clamp to automatically spring to open condition.

* * * * *